March 14, 1950     N. B. WALES     2,500,390
THERMOSTATIC DEVICE
Filed July 2, 1948     3 Sheets-Sheet 1
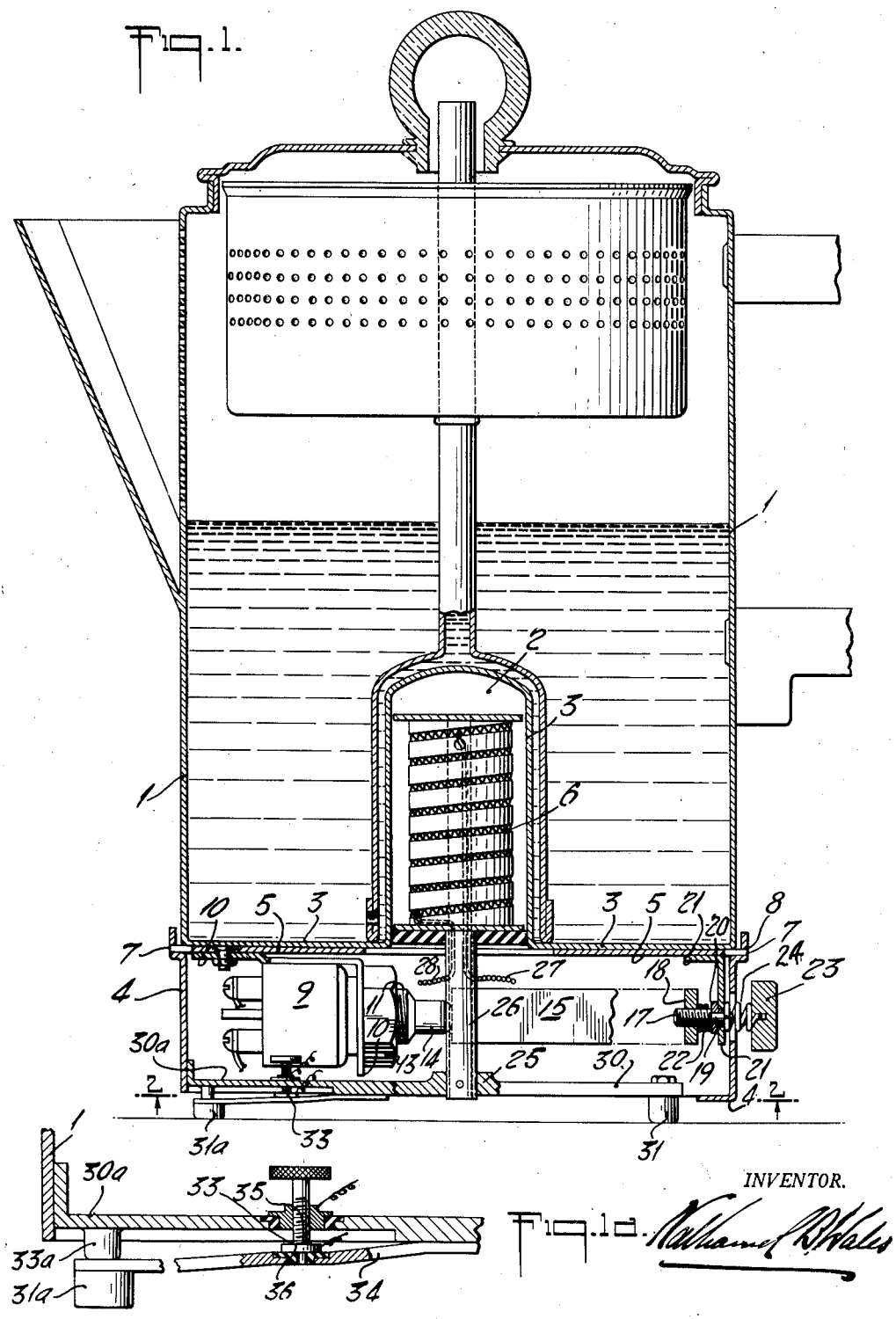
INVENTOR.
Nathaniel B. Wales

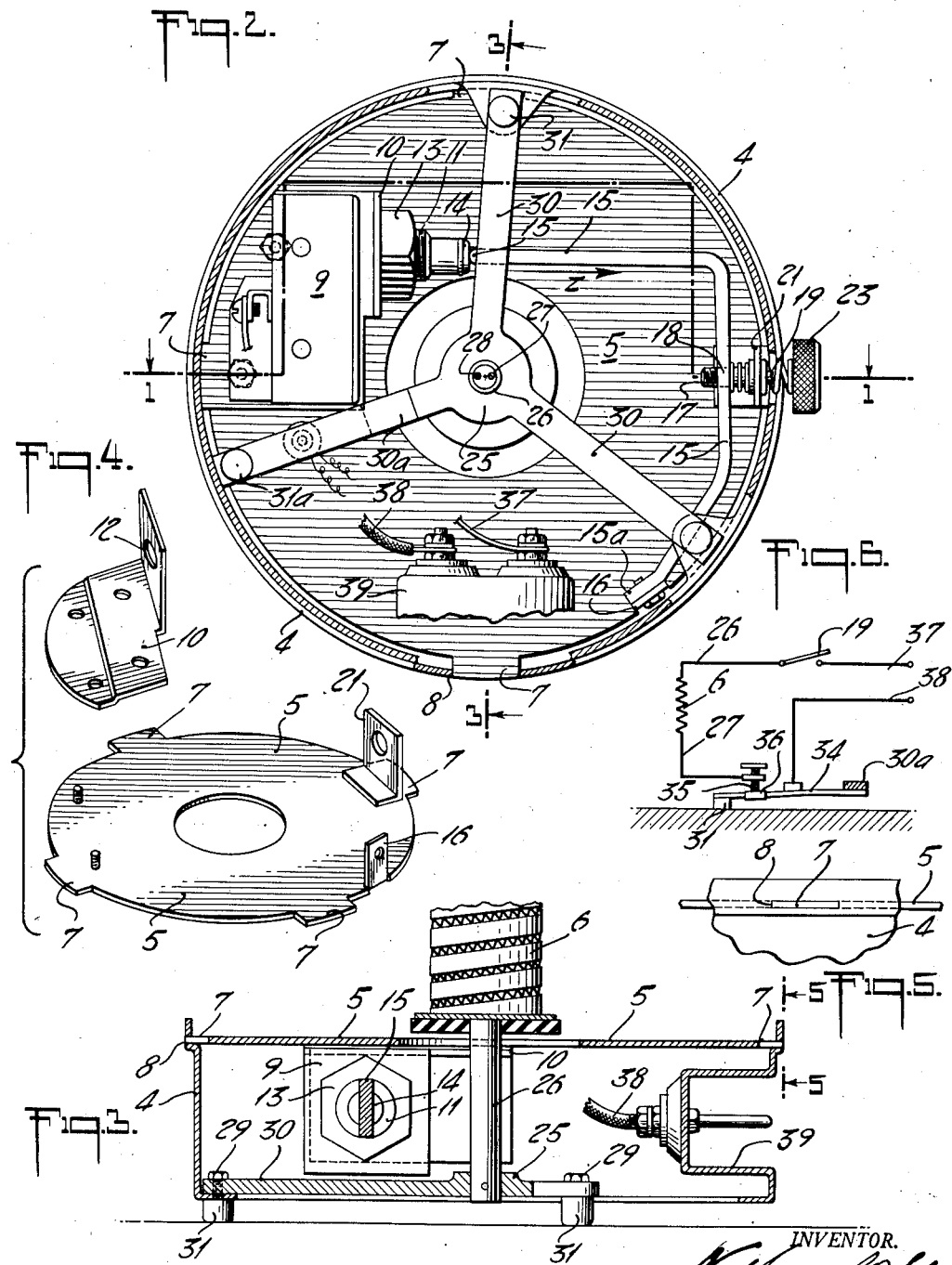

March 14, 1950 N. B. WALES 2,500,390
THERMOSTATIC DEVICE

Filed July 2, 1948 3 Sheets-Sheet 3

INVENTOR.
Nathaniel B. Wales

Patented Mar. 14, 1950

2,500,390

UNITED STATES PATENT OFFICE 2,500,390

THERMOSTATIC DEVICE

Nathaniel B. Wales, New York, N. Y.

Application July 2, 1948, Serial No. 36,757

3 Claims. (Cl. 219—43)

This invention relates to a thermostatic timing and actuating system and is in part a continuation and improvement of my patent application Serial Number 29,821.

In this invention a relatively thin sheet of metal, approximately disc form, having a high coefficient of thermal expansion is in thermal contact with the area or portion to be thermostatically measured. This disc of metal is also utilized as the chassis on which is secured and mounted as a unit the necessary components to harness the differential between the radial expansion of the disc and the linear expansion of the diametrically positioned actuator element, having a lesser coefficient of thermal expansion, which is secured on the underside of said disc. In this manner the differential in radial expansion of the disc and the linear expansion of the actuator element is made to actuate a snap type switch.

When such a thermostat is coordinated with the bottom of a cooking vessel the high thermal transmission factor between the relatively large area of the thin disc and the bottom of the vessel produces a very sensitive and accurate action.

This invention is illustrated in two embodiments, the first consisting of a separate thermostatically controlled heater base or stove in which the disc acts as a table or plate on which the cooking vessel or coffee pot is supported; the second, consists of the disc being permanently secured to the bottom of a coffee pot and in thermal contact therewith, the pot having a unitary base, or its own support.

An object of this invention is to attain an accurate and low-cost thermostat which may be fabricated as a unitary component, the upper surface of which is used as a vessel support.

A further object is to provide means to manually adjust and regulate the action of the thermostat.

A further object is to control the heating element for the cooking vessel by two separate control switches placed in series with the heating element, the first switch actuated by the disc type thermostat and the second by a predetermined weight of the contents of the coffee pot or cooking vessel.

Further objects and pertinent details will be more specifically described and illustrated in the accompanying specifications and drawings in which similar numerals refer to similar parts.

Figure 1 is an elevation in section, taken on line 1—1 in Figure 2, of the heater base or stove showing a percolator type coffee pot designed to accommodate in its base the elevated heating element of the thermostatically controlled separate base or stove. The coffee pot is shown supported by the disc type thermostatic element which forms the top plate of the stove.

Figure 1A is an enlarged detail of the gravity switch.

Figure 2 is a fragmentary view of the stove looking upward in the direction of arrows 2—2 in Figure 1.

Figure 3 is a section in elevation, taken on line 3—3 in Figure 2, showing the heating element secured into the base or stove.

Figure 4 is an exploded inverted perspective view of the thermostatic disc which forms the top of the stove and which serves as a chassis to support the thermostatic components associated therewith.

Figure 5 is a fragmentary view in elevation looking in the direction of arrow 5 to specifically show one of the tongues which support the disc on the base.

Figure 6 is a schematic wiring diagram of the stove showing two control switches in series with the heating element.

Figure 7:
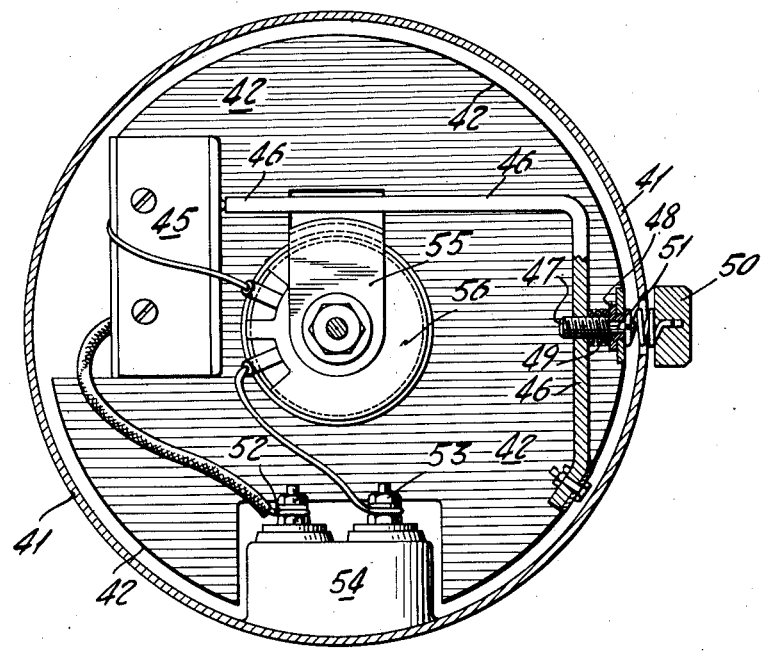
Figure 7 illustrates the second embodiment of the invention wherein the disc type thermostat unit is permanently secured to the bottom of a self-sustaining cooking vessel and is a view looking in the direction of arrows 7 in Figure 8.

In Figure 1, numeral 1 represents a percolating coffee pot or other type of cooking vessel, which is made with a recess 2 formed in its base 3 to accommodate the heater 6 secured to the stove 4. In this manner when pot 1 is positioned on the stove or heater base 4 it contacts and is supported by the thermostatic top plate 5 seen inverted in perspective view in Figure 4.

Plate or disc 5 is formed of a metal, such as aluminum, having a relatively high coefficient of thermal expansion and is supported in the case of stove 4 by ears or tongue members 7 which enter registering orifices 8 formed therein, thus permitting radial expansion of disc 5, see Figures 3 and 4. The plate or disc 5 also serves as a chassis to which may be suitably secured the switch 9 by means of lug member 10, shown as a separate element from disc 5. The switch 9 is shown fastened to member 10 by the extending threaded sleeve 11 of switch 9 entered into hole 12 in member 10 and secured by nut 13.

The actuating head or contactor 14 of snap switch 9 abuts actuator element 15, which is bent at approximately ninety degrees and terminates at 15a where it is suitably secured to disc 5 by lug 16 shown integral with disc 5 and which forms a pivoting point by flexure or otherwise. However, to accurately dictate the relative position of element 15 in respect to contactor 14 I use a screw member 17 which is in threaded engagement with element 15 at the point 18. The shank 19 of screw member 17 is force-fitted into sleeve 20 which is journaled in lug 21 suitably secured to the perimeter of disc 5.

A spring 22, under compression between element 15 at the point 18 thereof and sleeve 20, biases sleeve 20 against lug 21 and the compression of spring 22 is of a magnitude to exceed the force necessary to actuate the snap movement in switch 9. By turning adjusting knob 23 the effective length of element 15 is changed as desired.

In order to protect the relative adjustment of the thermostat components, viz: actuator bar 15, disc 5, switch 9, the manual adjusting knob 23 is to a degree resiliently mounted on shank 19 by spring 24 secured thereto so that if the stove 4 fell to the floor and hit on knob 23 the damage would be minimized. A suitable index, not shown, can be secured to case 4 to aid in the adjustment of knob 23.

The heating element 6 is secured to spider 25 by tubular pedestal 26 through which electric leads 27 and 28 are connected to heater 6, see wiring diagram Figure 6. Support spider 25 is secured through two legs 30 and a third leg 30a to case 4 by screws 29 to which are attached feet 31. On leg 30a is secured gravity switch 33, the actuating member of which is spring arm 34 one end of which is secured to the underside of leg 30a while the other end supports foot 31a. Spring arm 34 is so proportioned as to support the stove or heater base 4 as well as the empty cooking vessel thereon without deflecting sufficiently to cause switch terminal 35 to contact terminal 36. However, if a predetermined minimum of liquid is contained in vessel 1, terminals 35 and 36 will contact closing the electrical circuit to heater 6 providing switch 9 so dictates and completes the heater energizing circuit to supply terminals 37 and 38. A stop 33a limits the upward deflection of spring arm 34.

Figure 8:
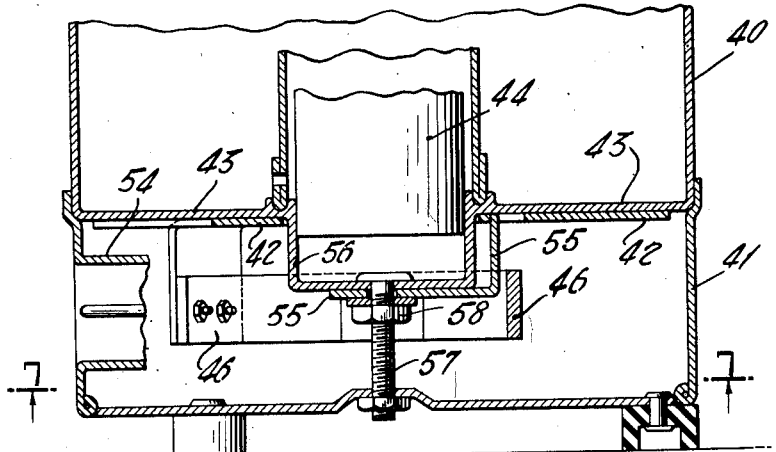
Figure 8 is an elevation in section, taken on line 8—8 in Figure 7.

Referring to Figures 7 and 8. In this embodiment of the disc type of thermostat the coffee pot 40 is similar to that shown in my copending patent application Serial Number 29,821 wherein the pot 40 is formed substantially integral with the skirt or base 41. A disc of aluminum 42 is in thermal contact with the bottom 43 of the vessel 40 to which a submerged type of heater 44 is suitably affixed in a recess 56 in the bottom 43 of pot 40. As in the case of thermostatic disc 5 in Figures 1 to 7 the disc 42 acts as a chassis for switch 45, actuator element 46 and the manual control assembly composed of screw 47, journaling sleeve 48, spring 49 and the resiliently mounted control knob 50 secured to the shank 51 of screw 47.

In order to insert disc 42 with its unitized thermostatic components into base 41 disc 42 has cutouts to accommodate the main terminals 52 and 53 and the inwardly extending boss 54. An arm 55, attached to disc 42, secured by nut 58 to the threaded rod 57, which is secured into the recess 56 maintains disc 42 in thermal contacting position with the bottom 43 of vessel 40. It is seen that the diameter of disc 42 is less than the diameter of base 41 so that should base 41 be dented in a fall, disc 42 and its adjusted components would not be injured.

In describing the action and operation of the thermostatic disc unit I will refer to disc 5 since the action of disc 42 is similar in all respects.

When pot 1 suitably supplied with ground coffee and cold water is positioned on plate or disc 5 and the electric supply plug, not shown, has been connected to terminals 37 and 38 due to the weight of liquid in pot 1 the flexible arm 34 supporting foot 31a, one of three feet supporting stove 4, is deflected sufficiently to cause contacts 35 and 36 to meet and the circuit as shown in wiring diagram 6 is closed and the heater 6 is energized. The closure of switch 9 when pot 1 is relatively cold is predicated on the adjustment of knob 23 so that actuating element 15 has been moved inwardly towards switch actuating head 14 to that extent that actuating head 14 is in its "on" position in snap switch 9.

As the water in pot 1 is gradually heated by circulation caused by the percolating action existing therein the temperature of base 3 of pot 1 rises and transmits its temperature to the top plate 5 of heater base 4. Plate or disc 5 diametrically expands in its loosely sustained supports 7 thereby increasing the distance between actuator head 14 and the contacting end of actuator element 15 both of which are permanently secured at opposite perimeters thereof.

By actual tests when the temperature of the disc 5, reflecting the temperature of the bottom 3 of pot 1 has reached 195 degrees F. the dilation of disc 5 is sufficient to permit the actuator head 14 to move outward in the direction of arrow Z in Figure 2 two thousandths of an inch, a movement sufficient to actuate this type of micro snap switch from an "on" to an "off" position.

Inasmuch as an aluminum disc approximately four inches in diameter will expand some five thousandths of an inch in a temperature rise of 140 degrees, ample dilation of the disc is present to permit a variable time factor for brewing provided for by adjusting the manual knob 23 to effectively shorten or lengthen the length factor of actuator arm 15 which is preferably made of a metal of a relatively low coefficient of thermal expansion so as to obtain a differential of movement between the effective length of actuator arm 15 and the diameter of disc 5.

It should be noted that the separate stove or heater base 4 as shown in Figures 1 to 6 affords use of an automatic coffee pot without any electric elements in the pot proper, so that it may be cleaned and washed without fear of wet connections or short circuits.

Although the specifications use the term disc in describing the element having a high coefficient of thermal expansion it is to be noted that the element is more specifically an annulus, the central orifice being used to isolate the temperature responsive element from the heat radiating directly from the immersed type heater.

To those skilled in the art it is evident that the actual bottom or base 3 of the coffee pot, as is used for illustrative purposes in the drawings, can be readily utilized in this thermostat as the disc or annulus formed element 5 having a high coefficient of thermal expansion, the lugs 19, 16 and 21, as fully described above being bonded, welded or otherwise secured to its underside to support and coordinate the switch 9, actuator element 15 and manual adjusting components thereof.

What I desire to protect by United States Letters Patent is encompassed in the following claims:

1. A stove comprising an electric heating element, a stove top, said heating element positioned substantially above said stove top, recess means in a percolator coffee pot to receive said elevated heating element within said pot and to permit said pot to be supported on said stove top, a snap switch to control said electric heater secured to the underside of said stove top near its periphery and an actuator bar for said switch secured at one end to the diametrically opposite periphery of said stove top, the other end of said actuator bar contacting said switch, said actuator bar having a lower coefficient of thermal expansion than said stove top wherein the heat radiation from the bottom of said coffee pot supported thereon acting on the difference of the thermal expansion coefficient of said stove top and said actuator bar controls the "off" and "on" position of said switch to de-energize and energize said elevated heater.

2. A stove comprising an electric heating element, a stove top therefor formed as an annulus, said heating element positioned substantially above said stove top, means for supporting said heating element through the open center of said stove top, recess means in the bottom of a coffee pot to receive said elevated heater element within said pot and to permit said pot to be supported on said stove top, a switch to control said heater secured to the underside of said stove top near its periphery and an actuator bar for said switch secured at one end to the periphery of said stove top at a point diametrically opposite said switch, the other end of said actuator bar contacting said switch, said actuator bar having a lower coefficient of thermal expansion than said stove top, wherein the heat radiated from the bottom of said coffee pot acting on the difference of the thermal expansion coefficient of said stove top and said actuator bar, control the "off" and "on" position of said switch to de-energize and energize said electric heater.

3. A thermostatic system incorporated in an automatic electric percolator comprising a brewing receptacle, a supporting base therefor, a submerged type heating element positioned in a recess protruding inwardly from the bottom of said receptacle, a switch in a normally "on" position to energize said heating element, a bimetallic thermostat, the high coefficient of thermal expansion element thereof composed of a sheet of aluminum formed as an annulus, the top surface thereof in thermal contacting position with the bottom of said receptacle, the orifice in said annulus registering with said recess in said receptacle, said switch secured to the underside of said annulus near its periphery, the relatively low coefficient of thermal expansion element of said bimetallic thermostat formed as an actuator bar, one of its ends secured to the periphery of said annulus approximately diametrically opposite to said switch, actuating means incorporating the other end of said actuator bar and said switch to move said switch to its "off" position when the radial expansion of said annulus has attained a predetermined degree by the heat transmitted to it by its thermal contact with the bottom of said receptacle.

NATHANIEL B. WALES.

REFERENCES CITED

The following references are of record in the file of this patent:

UNITED STATES PATENTS

| Number | Name | Date |
|---|---|---|
| 1,907,199 | Hurxthal | May 2, 1933 |
| 2,076,096 | Samuels et al. | Apr. 6, 1937 |
| 2,112,731 | Bruning et al. | Mar. 29, 1938 |
| 2,194,118 | Graham | Mar. 19, 1940 |